US012665446B2

(12) United States Patent       (10) Patent No.:   US 12,665,446 B2
Kochura et al.                       (45) Date of Patent:    Jun. 23, 2026

(54) AUGMENTED REALITY WIRELESS CHARGING LAYOUT

(71) Applicant: INTERNATIONAL BUSINESS MACHINES CORPORATION, Armonk, NY (US)

(72) Inventors: Nadiya Kochura, Bolton, MA (US); Su Liu, Austin, TX (US); Hamid Majdabadi, Ottawa (CA); Yang Liang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 427 days.

(21) Appl. No.: 17/933,949

(22) Filed: Sep. 21, 2022

(65) Prior Publication Data

US 2024/0097506 A1     Mar. 21, 2024

(51) Int. Cl.
| | |
|---|---|
| *H02J 50/90* | (2016.01) |
| *H02J 50/80* | (2016.01) |
| *H04W 4/02* | (2018.01) |
| *H04W 4/024* | (2018.01) |
| *H04W 4/029* | (2018.01) |

(52) U.S. Cl.
CPC .............. *H02J 50/90* (2016.02); *H02J 50/80* (2016.02); *H04W 4/024* (2018.02); *H04W 4/025* (2013.01); *H04W 4/029* (2018.02)

(58) Field of Classification Search
CPC ..................................................... H02J 50/90
USPC ......................................................... 320/108
See application file for complete search history.

(56) References Cited

U.S. PATENT DOCUMENTS

| | | | |
|---|---|---|---|
| 8,193,764 | B2 | 6/2012 | Jakubowski |
| 10,084,336 | B2 | 9/2018 | Gu |
| 10,615,647 | B2 | 4/2020 | Johnston |
| 10,804,727 | B2 | 10/2020 | Gu |
| 10,827,322 | B1 | 11/2020 | Lal |
| 2012/0176376 | A1 | 7/2012 | Kim |

(Continued)

OTHER PUBLICATIONS

Azab et al., "Exposure to electromagnetic fields induces oxidative stress and pathophysiological changes in the cardiovascular system," MedCrave, Journal of Applied Biotechnology & Bioengineering, vol. 4, Issue 2, Published Oct. 30, 2017, pp. 540-545.

(Continued)

*Primary Examiner* — Ahmed H Omar
(74) *Attorney, Agent, or Firm* — Anthony M. Pallone

(57)       ABSTRACT

According to one embodiment, a method, computer system, and computer program product for creating a wireless charging layout. The embodiment may include receiving one or more signals from one or more wireless charger devices within a given space. The embodiment may include identifying a location of a power-consuming electric device within the given space. The embodiment may include identifying respective signal strengths of the one or more wireless charger devices relative to the location of the power-consuming electric device. The embodiment may include retrieving a floor plan of the given space. The embodiment may include creating a signal strength map of the identified respective signal strengths using the retrieved floor pan. The embodiment may include creating an augmented reality (AR) wireless charging layout of the given space based on the signal strength map.

14 Claims, 2 Drawing Sheets

(56) References Cited

U.S. PATENT DOCUMENTS

| | | | |
|---|---|---|---|
| 2013/0099776 A1 | 4/2013 | Wu | |
| 2014/0285317 A1 | 9/2014 | Shimizu | |
| 2015/0048789 A1 | 2/2015 | Kim | |
| 2016/0087486 A1* | 3/2016 | Pogorelik | H04B 5/79 320/108 |
| 2017/0318519 A1* | 11/2017 | Belz | G06V 20/20 |
| 2018/0102858 A1 | 4/2018 | Tiwari | |
| 2020/0110374 A1* | 4/2020 | Piaskowski | G05F 1/66 |

OTHER PUBLICATIONS

Disclosed Anonymously, "A method for direction guidance and data pre-load based on the signal strength map," IP.com, IP.com No. IPCOM000244637D, IP.com Publication Date: Jan. 4, 2016, 10 pages.

Disclosed Anonymously, "A system to suggest nearest device, which can provide wireless charge, to a device in need of charge," IP.com, IP.com No. IPCOM000255522D, IP.com Publication Date: Sep. 29, 2018, 3 pages.

Finegan, "A System for Three Dimension Representation of Wireless Communication System Parameters," IP.com, IP.com No. IPCOM000131211D, IP.com Publication Date: Nov. 9, 2005, 3 pages.

Hill, "When will your phone charge wirelessly in your pocket? We asked an expert," digitaltrends, Apr. 28, 2018, https://www.digitaltrends.com/cool-tech/wireless-charging-over-distance-barriers/, 35 pages.

Lovejoy, "Explainer: Why Apple didn't put long-distance charging into an iPhone, and won't for some time," 9TO5Mac, Jan. 3, 2018, https://9to5mac.com/2018/01/03/long-distance-charging-rf-charging-primer/, 13 pages.

Mearian, "Wireless charging explained: What is it and how does it work?," Computerworld, Mar. 28, 2018 https://www.computerworld.com/article/3235176/wireless-charging-explained-what-is-it-and-how-does-it-work.html, 14 pages.

Perzow et al., "Wireless charging efficiency: how to measure in the real world," Feb. 26, 2016, Accessed: Jul. 25, 2022, https://www.powerelectronictips.com/measuring-wireless-charging-efficiency-in-the-real-world/, 12 pages.

Rioult et al., "Autonomous electromagnetic mapping system in augmented reality," IEEE, Proc. of the 2019 International Symposium on Electromagnetic Compatibility (EMC Europe 2019), Barcelona, Spain, Sep. 2-6, 2019, pp. 138-143.

Unknown, "Your Partner for Long-Distance Wireless Charger Products," One Pointech, Accessed Jul. 25, 2022, https://www.onepointech.com/, 11 pages.

Mevissen et al. "Newsletter—Special Issue Jan. 2021", Berenis, Jan. 2021, 9 pages.

No Author, "Energous", 9TO5MAC, Jan. 2018, 8 Pages.

* cited by examiner

100

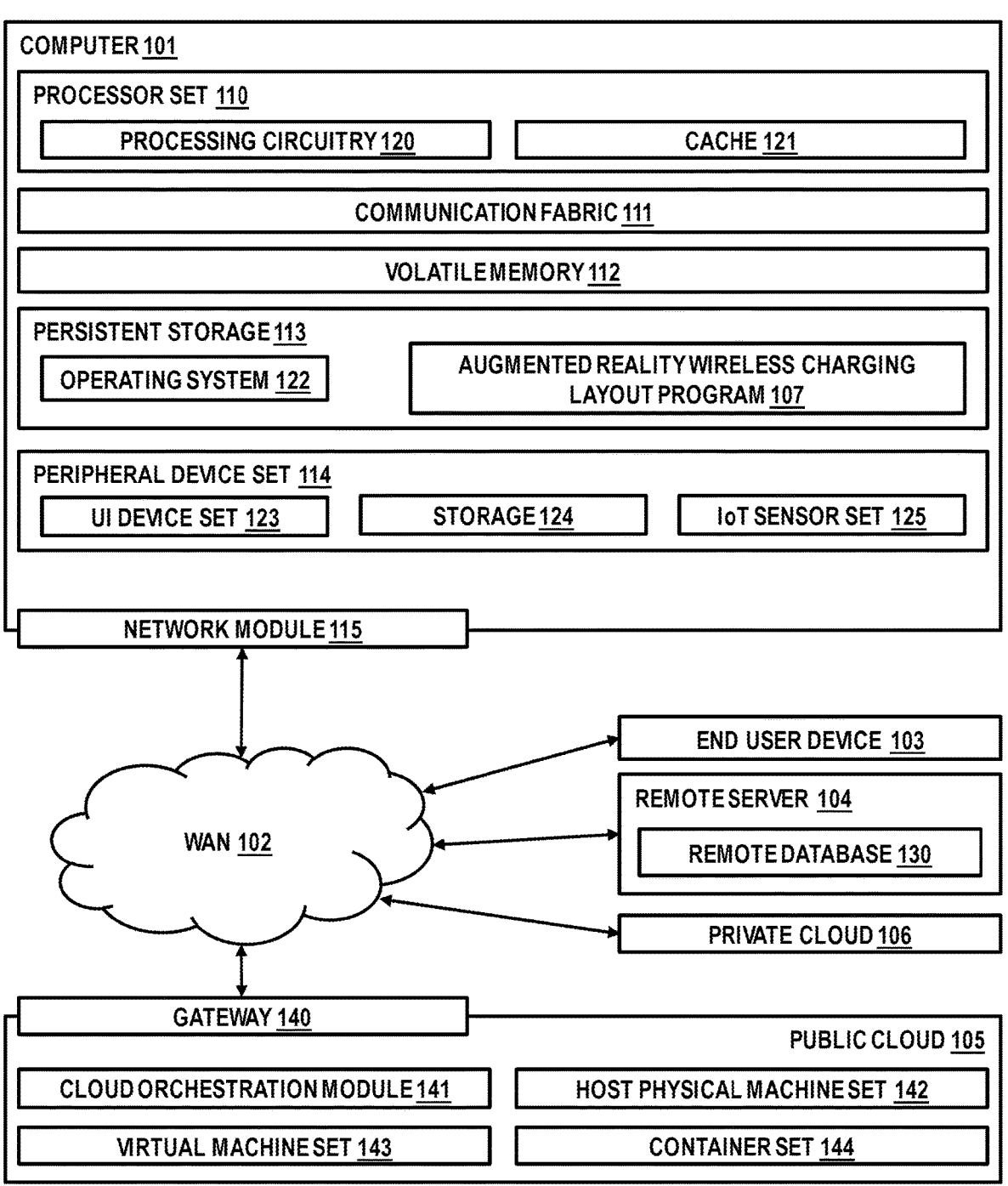

COMPUTER 101

PROCESSOR SET 110

PROCESSING CIRCUITRY 120　　　　CACHE 121

COMMUNICATION FABRIC 111

VOLATILE MEMORY 112

PERSISTENT STORAGE 113

OPERATING SYSTEM 122　　　AUGMENTED REALITY WIRELESS CHARGING LAYOUT PROGRAM 107

PERIPHERAL DEVICE SET 114

UI DEVICE SET 123　　　STORAGE 124　　　IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141　　　HOST PHYSICAL MACHINE SET 142

VIRTUAL MACHINE SET 143　　　CONTAINER SET 144

*Figure 1*

AUGMENTED REALITY WIRELESS CHARGING LAYOUT

BACKGROUND

The present invention relates generally to the field of computing, and more particularly to wireless power transfer.

Wireless charging (also referred to as wireless power transfer, wireless energy transmission, or electromagnetic power transfer) is the transmission of electrical energy without wires as a physical link. In a wireless charging system, a transmitter device (i.e., a wireless charger device), which receives electric power from a power source, generates a time-varying electromagnetic field. The generated electromagnetic field transmits power across an intervening space to one or more power-consuming receiving devices (e.g., smartphone, laptop) which extracts power from the field and supplies it to an electric load. Some implementations of wireless charging may utilize radiative, or far-field, techniques where power is transferred over longer distances via beams of electromagnetic radiation. In radiative techniques, the wireless transmission of energy may be "aimed" at a receiving device (e.g., through power beaming or beam-formed signals) or may be emitted in broadcast form. The technology of wireless power transmission may eliminate the use of wires and batteries, thus increasing mobility, convenience, and safety of a power-consuming receiving device.

SUMMARY

According to one embodiment, a method, computer system, and computer program product for creating a wireless charging layout. The embodiment may include receiving one or more signals from one or more wireless charger devices within a given space. The embodiment may include identifying a location of a power-consuming electric device within the given space. The embodiment may include identifying respective signal strengths of the one or more wireless charger devices relative to the location of the power-consuming electric device. The embodiment may include retrieving a floor plan of the given space. The embodiment may include creating a signal strength map of the identified respective signal strengths using the retrieved floor pan. The embodiment may include creating an augmented reality (AR) wireless charging layout of the given space based on the signal strength map.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 1 illustrates an exemplary computer environment according to at least one embodiment.

DETAILED DESCRIPTION

Figure 2:
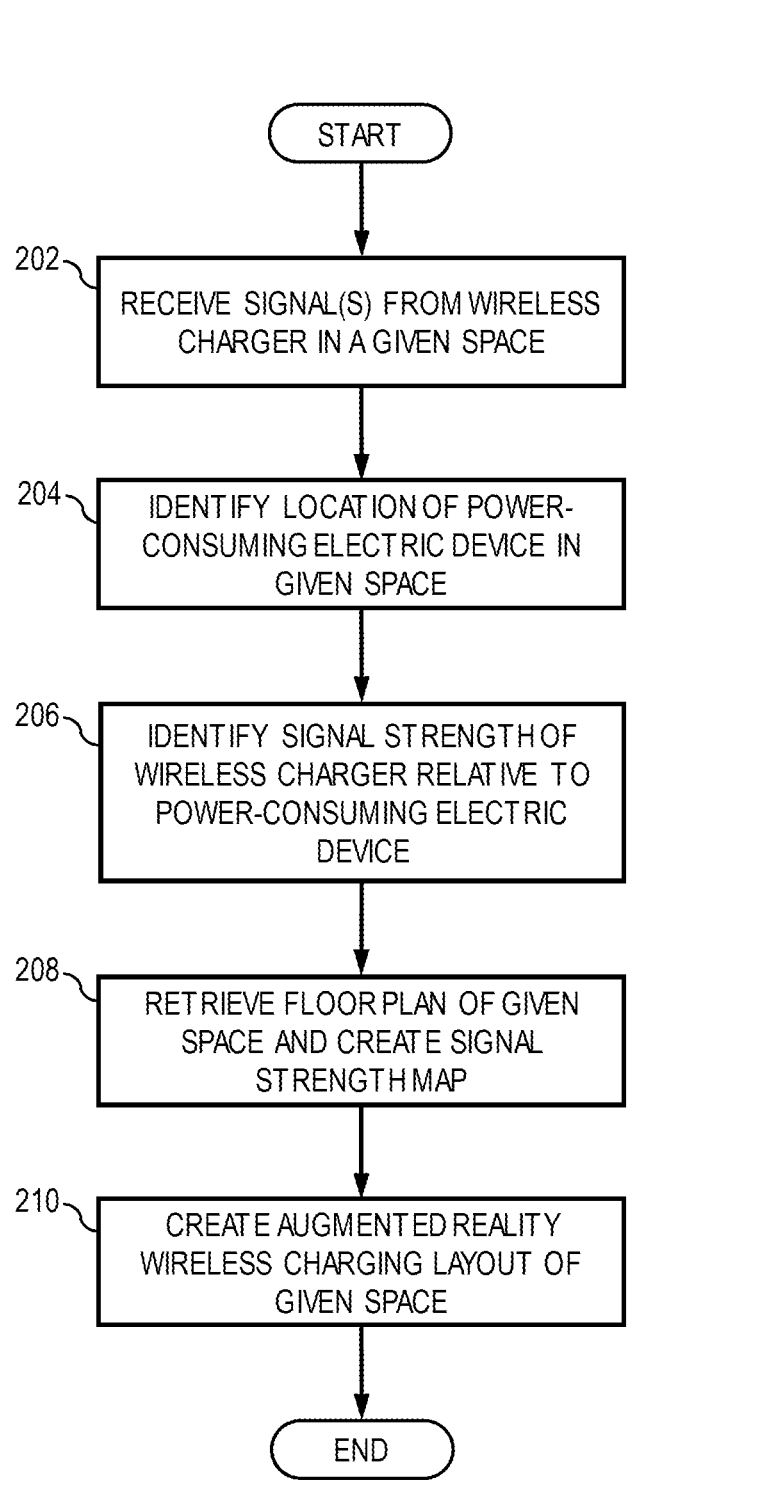
FIG. 2 illustrates an operational flowchart for creating an augmented reality wireless charging layout via an augmented reality wireless charging layout creation process according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

The present invention relates generally to the field of computing, and more particularly to wireless power transfer. The following described exemplary embodiments provide a system, method, and program product to, among other things, render an augmented reality (AR)-based mapping/ layout of wireless charging capabilities in a given space. Therefore, the present embodiment has the capacity to improve the technical field of wireless power transfer by dynamically identifying signal strengths of one or more wireless chargers present within a given space and rendering an AR-based layout of the space depicting existing wireless charger locations and their identified respective signal strengths, thus enabling a user of a power-consuming electronic device to optimally position their device for wireless power transfer.

As previously described, wireless charging (also referred to as wireless power transfer, wireless energy transmission, or electromagnetic power transfer) is the transmission of electrical energy without wires as a physical link. In a wireless charging system, a transmitter device (i.e., a wireless charger device), which receives electric power from a power source, generates a time-varying electromagnetic field. The generated electromagnetic field transmits power across an intervening space to one or more power-consuming receiving devices (e.g., smartphone, laptop) which extracts power from the field and supplies it to an electric load. Some implementations of wireless charging may utilize radiative, or far-field, techniques where power is transferred over longer distances via beams of electromagnetic radiation. In radiative techniques, the wireless transmission of energy may be "aimed" at a receiving device (e.g., through power beaming or beam-formed signals) or may be emitted in broadcast form. For the sake of simplicity, this disclosure describes broadcast radiative energy. However, both forms of wireless charging ("aimed" radiative energy and broadcast radiative energy) may be used with the techniques described. The technology of wireless power transmission may eliminate the use of wires and batteries, thus increasing mobility, convenience, and safety of a power-consuming receiving device.

As the technology for wireless charging is evolving and becoming increasingly popular, interest from users to take advantage of wireless power transfer techniques to charge their power-consuming electric devices (e.g., Internet-of-Things (IoT) devices) has also increased. Accordingly, it is becoming more common for enterprises and end users to equip their respective office, commercial, and residential locations with wireless charger devices. Additionally, interest in wireless power transfer techniques across long distances (e.g., across several feet) has also increased. Such techniques may include infrared (IR) wireless charging and radio frequency (RF) wireless charging. RF wireless charging is a type of uncoupled wireless charging in which an antenna embedded in an electronic device may receive radio frequency waves from one or more external sources (i.e., a wireless charger) and convert the waves' energy to direct current voltage which is used to power the electronic device or recharge its battery. As an RF wireless charger harnesses the power of waves in the radio spectrum to transfer energy, it may create a charging zone within a given space that is similar to a Wi-Fi hotspot. However, a user of a power-consuming electric device may not be aware of the location of the wireless charger within the space. Moreover, a speed and intensity of wireless power transfer from the wireless charger to a power-consuming electric device may be inversely proportional to a distance between the charger and the device. Hence, the user may not know where to position themself and/or their power-consuming electric device within the space, relative to the wireless charger, so as to optimize wireless power transfer to their device. It may therefore be imperative to have a system in place to dynamically render and display an AR-based mapping of a given space which depicts locations of one or more wireless chargers present within the space, along with depictions of their respective charging zones and signal strengths, and locations of one or more power-consuming electric devices of a user relative to depicted wireless chargers. Thus, embodiments of the present invention may be advantageous to, among other things, calculate received signal strengths of one or more wireless chargers existing within a given space, identify locations of one or more wireless chargers and locations of one or more power-consuming electric devices within a given space, create a wireless charging signal strength map for a floor plan of a given space, and render an AR-based layout of a given space which depicts, at least, a location of a wireless charger present within the space, a signal strength and/or charging zone of the wireless charger, and a location, relative to the wireless charger, of a power-consuming electric device present within the space. The present invention does not require that all advantages need to be incorporated into every embodiment of the invention.

According to at least one embodiment, one or more signals from one or more respective wireless chargers in a given space may be received by a power-consuming electric device of a user. Location information of the power-consuming electric device within the given space may be identified. A location and a signal strength of respective wireless chargers, relative to the location of the power-consuming electric device, may be identified based on their received signals. A floor plan of the given space may be retrieved, and a wireless charging signal strength map may be created. According to at least one embodiment, an AR-based layout of the given space may be rendered using the retrieved floor plan and displayed to the user via the power-consuming electric device. The AR-based layout may depict visuals corresponding to the locations of respective wireless chargers within the given space, a location of the power-consuming electric device within the given space, and signal strengths and/or charging zones of the respective wireless chargers relative to the location of the power-consuming electric device.

According to at least one other embodiment, an image of the given space may be utilized in addition to, or in place of, a floor plan of the given space. The image may be captured by a camera of the power-consuming electric device. Alternatively, the image may be captured by a camera of another device and received by the power-consuming electric device of the user. Furthermore, the AR-based layout may be rendered using the captured image of the given space and displayed to the user. According to yet another embodiment, visuals and information corresponding to the locations of respective wireless chargers within the given space, a location of the power-consuming electric device within the given space, and signal strengths and/or charging zones of the respective wireless chargers relative to the location of the power-consuming electric device may be displayed to the user in a virtual reality (VR) environment of the given space (e.g., a metaverse representation of the given space).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method, and program product to identify signal strengths of one or more wireless chargers within a given space according to their respective locations relative to a power-consuming electric device within the given space and, accordingly, display an AR-based layout of the given space which indicates one or more optimal charging zones for the power-consuming electric device.

Referring to FIG. 1, an exemplary computing environment 100 is depicted, according to at least one embodiment. Computing environment 100 contains an example of an environment for the execution of at least some of the computer code involved in performing the inventive methods, such as augmented reality wireless charging layout (ARWCL) program 107. In addition to ARWCL program 107, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and ARWCL program 107), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smartphone, smart watch or other wearable computer, mainframe computer, quantum computer or any other form of computer or mobile device now known or to be developed in the future that is capable of running a program and accessing a network or querying a database, such as remote database 130. Additionally, computer 101 may be any other form of computer or mobile device now known or to be developed in the future that is AR/VR-enabled. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in ARWCL program 107 within persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in ARWCL program 107 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as smart glasses, smart watches, AR/VR-enabled headsets, and wearable cameras), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer, another sensor may be a motion detector, another sensor may be a global positioning system (GPS) receiver, and yet another sensor may be a digital image capture device (e.g., a camera) capable of capturing and transmitting one or more still digital images or a stream of digital images (e.g., digital video).

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a client of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to at least one embodiment, EUD 103 may additionally be a wireless charger device now known or to be developed in the future that is capable of transmitting power wirelessly to one or more power-consuming electric devices in accordance with any government regulations regarding wireless power output. For example, EUD 103 may be any known IR wireless charger that transmits power to computer 101 wirelessly through power beaming or beam-formed signals. As another example, EUD 103 may be any known RF wireless charger capable of providing radiated energy to computer 101. Although depicted as a single device, computing environment 100 may include a plurality of EUDs 103.

The ARWCL program 107 may be a program capable of identifying respective signal strengths and charging zones for one or more wireless chargers within a given space and creating an AR-based mapping/layout of the given space which depicts a floor plan or an image of the given space with overlaid AR renderings indicating information including locations of the one or more wireless chargers within the given space, locations of one or more power-consuming electric device also within the given space, and signal strengths and/or charging zones of the one or more wireless chargers relative to the locations of the one or more power-consuming electric devices. In at least one embodiment, ARWCL program 107 may require a user to opt-in to system usage upon opening or installation of ARWCL program 107. Notwithstanding depiction in computer 101, ARWCL program 107 may be stored in and/or executed by, individually or in any combination, end user device 103, remote server 104, public cloud 105, and private cloud 106 so that functionality may be separated among the devices. The augmented reality wireless charging layout creation method is explained in further detail below with respect to FIG. 2.

Referring now to FIG. 2, an operational flowchart for creating an AR wireless charging layout/mapping via an augmented reality wireless charging layout creation process 200 is depicted according to at least one embodiment. At 202, ARWCL program 107 receives one or more signals from one or more wireless charger devices (e.g., EUD 103) present within a given space (e.g., a defined indoor or outdoor space). The signals may be received by a power-consuming electric device (e.g., computer 101) of a user which is also present within the given space and executing an instance of ARWCL program 107. Moreover, the signals received from a wireless charger device (e.g., a RF wireless charger) may include electromagnetic field (EMF) Wi-Fi signals, providing internet connectivity, and/or EMF wireless charging signals (e.g., radio frequency signals), providing wireless power transfer, along with contextual information of the wireless charger device and transmitted signal(s). The contextual information may include an identifier of the wireless charger device, a location/placement of the wireless charger device within the given space, and attributes of transmitted signals such as frequency, intensity, wavelength, and propagation direction. According to at least one embodiment, a wireless charging signal transmitted by the wireless charger device may provide electric power to the power-consuming electric device receiving the signal.

Next, at 204, ARWCL program 107 identifies a location of the power-consuming electric device present within the given space. According to at least one embodiment, an instance of ARWCL program 107 executing on the power-consuming electric device may utilize, or access, self-location mechanisms such as existing indoor localization/navigation techniques to identify the location of the power-consuming electric device within the given space. For example, the power-consuming electric device may be localized within the given space according to Wi-Fi and access point connection tracking. According to at least one other embodiment, ARWCL program 107 may identify a location of the power-consuming electric device via information (e.g., GPS coordinates of the device) received from a GPS receiver of the power-consuming electric device.

At 206, ARWCL program 107 identifies respective signal strengths and/or charging zones of the one or more wireless charger devices present within the given space, relative to the identified location of the power-consuming electric device. A signal strength of a wireless charger device, relative to the power-consuming electric device, may be dependent upon its location (e.g., distance and angle) relative to the power-consuming electric device. For example, radio waves from an RF wireless charger are subject to the inverse-square law which dictates that intensity (i.e., signal strength) received by a power-consuming electric device is inversely proportional to the square of the distance from the RF wireless charger. In other words, the farther away the power-consuming electric device is from the RF wireless charger, the weaker its received signal strength may be. As part of identifying a respective signal strength and/or charging zone of a wireless charger device relative to the power-consuming electric device, ARWCL program 107 may identify a location/placement of the wireless charger device within the given space based on its transmitted signal(s). For example, ARWCL program 107 may identify a location/placement of a wireless charger device within the given space based on the contextual information of its transmitted signal(s). Additionally, ARWCL program 107 may utilize known calculation methods when identifying a respective signal strength and/or charging zone of a wireless charger device, relative to the power-consuming electric device, according to its location/placement within the given space.

Next, at 208, ARWCL program 107 retrieves a floor plan of the given space. According to at least one embodiment, ARWCL program 107 may retrieve the floor plan from an indoor localization application or from a floor plan repository stored in persistent storage 113 of computer 101 or remote database 130 of remote server 104. According to at least one other embodiment, where a floor plan of the given space is unavailable, ARWCL program 107 may create a schematic floor plan of the given space based on information input by the user and/or images of the given space captured by a camera of the power-consuming electric device or a camera of another device and sent to ARWCL program 107. According to yet another embodiment, a digital image of the given space may be utilized in place of a retrieved floor plan of the given space. The image may be captured by a camera of the power-consuming electric device, or the image may be captured by a camera of another device within the given space.

Additionally at 208, ARWCL program 107 creates a wireless charging signal strength map of the identified respective signal strengths and/or charging zones of the one or more wireless charger devices present within the given space, relative to the identified location of the power-consuming electric device. The wireless charging signal strength map may be created using the retrieved floor plan of the given space and/or a captured digital image of the given space. According to at least one embodiment, in creating the wireless charging signal strength map, ARWCL program 107 may augment the retrieved floor plan and/or the captured digital image of the given space with visual details indicating the identified location of the power-consuming electric device within the given space, the identified location/placement of the wireless charger device within the given space, and the identified respective signal strengths and/or charging zones of the one or more wireless charger devices present within the given space, relative to the power-consuming electric device.

According to at least one other embodiment, ARWCL program 107 may output information relating to wireless charging signal strengths of one or more wireless charger devices relative to one or more power-consuming electric devices in a table format such as example Table 1 below:

TABLE 1

| Room ID | Wireless Charger ID | IoT Device ID | Distance to Charger | Signal Strength |
|---------|---------------------|---------------|---------------------|-----------------|
| Room-1 | Charger-1 | Device-1 | 1 | 80% |
| Room-1 | Charger-2 | Device-1 | 2 | 40% |
| Room-1 | Charger-3 | Device-1 | 3 | 10% |
| Room-1 | Charger-4 | Device-1 | 4 | 5% |
| Room-1 | Charger-1 | Device-2 | 4 | 3% |
| Room-1 | Charger-2 | Device-2 | 3 | 8% |
| Room-1 | Charger-3 | Device-2 | 2 | 40% |
| Room-1 | Charger-4 | Device-2 | 1 | 80% |
| Room-1 | Charger-1 | Device-3 | ∞ (out of range) | 0% |
| Room-1 | Charger-2 | Device-3 | ∞ (out of range) | 0% |
| Room-1 | Charger-3 | Device-3 | ∞ (out of range) | 0% |
| Room-1 | Charger-4 | Device-3 | ∞ (out of range) | 0% |

The output table may be displayed to the user (e.g., via a screen of the power-consuming electric device of the user or other AR-enabled device of the user) and provide visual feedback to the user indicating one or more optimal locations (e.g., a location with greatest signal strength relative to the location the power-consuming electric device) within the given space.

At 210, ARWCL program 107 creates a real-time AR wireless charging layout of the given space. More specifically, ARWCL program 107 may render, within an extended reality (XR) such as AR, a depiction of the retrieved floor plan and/or the captured digital image of the given space, as augmented in step 208, with overlaid AR visuals corresponding to the identified location of the power-consuming electric device within the given space, identified locations/placements of the one or more wireless charger devices within the given space, and the identified respective signal strengths and/or charging zones of the one or more wireless charger devices present within the given space, relative to the power-consuming electric device. The rendered AR depiction may be displayed to the user (e.g., via a screen of the power-consuming electric device of the user or other AR-enabled device of the user) and provide visual feedback to the user indicating one or more optimal locations (e.g., a location with greatest signal strength relative to the location the power-consuming electric device) within the given space to position the power-consuming electric device for wireless reception of power. Additionally, the rendered AR depiction may be useful in identifying locations/placements of fixed IoT devices within the given space.

According to at least one embodiment, in addition to displaying the rendered AR depiction to the user, ARWCL program 107 may suggest to the user, via displayed text and/or voice prompt, a location for wireless reception of power within the given space. For example, ARWCL program 107 may display text which suggests that the user proceed to the nearest location within the given space having a greatest signal strength or a signal strength above a threshold value. Furthermore, ARWCL program 107 may guide the user via displayed text commands and/or voice commands to a location for wireless reception of power within the given space. Updates to the displayed location of the power-consuming electric device within the rendered AR depiction may be periodically identified by ARWCL program 107 and displayed to the user, within the AR depiction, as they relocate to the location for wireless reception of power within the given space.

According to at least one other embodiment, where multiple wireless charger devices have been identified within the given space, ARWCL program 107 may display, within the rendered AR depiction, overlaid AR visuals which are color-coded or labeled for respective wireless charger devices within the given space. For example, overlaid AR visuals corresponding to an identified location/placement of a first wireless charger device within the given space and its identified respective signal strength and/or charging zone within the given space, relative to an identified location of the power-consuming electric device, may be color-coded green and/or labeled with an identifier of the first wireless charger device. Whereas overlaid AR visuals corresponding to an identified location/placement of a second wireless charger device within the given space and its identified respective signal strength and/or charging zone within the given space, relative to an identified location of the power-consuming electric device, may be color-coded yellow and/or labeled with an identifier of the second wireless charger device. Such color-coded overlaid AR visuals may enable a user to compare capabilities (e.g., signal strengths, charging zones) or respective wireless charger devices within the given space. Also, ARWCL program 107 may guide the user to a location within the given space having overlapping wireless charging zones from two or more wireless charger devices.

According to yet another embodiment, rendered visuals and information corresponding to the locations of respective wireless chargers within the given space, a location of the power-consuming electric device within the given space, and signal strengths and/or charging zones of the respective wireless chargers relative to the location of the power-consuming electric device may be displayed to the user in a virtual reality (VR) environment of the given space (e.g., a metaverse representation of the given space).

According to one further embodiment, the rendered AR depiction may also indicate one or more "safe harbor" locations within the given space to the user. A safe harbor location may be a location within the given space with minimized exposure to EMF radiation. For example, a user of a power-consuming electric device not requiring wireless power transfer may wish to be located in a location of the given space with a signal strength below a threshold value so as to reduce their EMF exposure.

It may be appreciated that FIG. 2 provides only an illustration of one implementation and does not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:

receiving one or more signals from one or more wireless charger devices within a given space, wherein the one or more signals comprise contextual information of the one or more wireless charger devices and their respectively transmitted signals;

identifying a location of a power-consuming electric device within the given space;

identifying, based on the contextual information, respective signal strengths of the one or more wireless charger devices relative to the location of the power-consuming electric device;

retrieving a floor plan of the given space;

creating a signal strength map of the identified respective signal strengths using the floor plan;

creating an augmented reality (AR) wireless charging layout of the given space based on the signal strength map and displaying the AR wireless charging layout to a user of the power-consuming electric device, wherein the AR wireless charging layout comprises AR visuals, overlaid on the retrieved floor plan, and wherein the AR visuals depict the identified location of the power-consuming electric device, the identified respective locations of the one or more wireless charger devices, and the identified respective signal strengths of the one or more wireless charger devices;

guiding, using text commands and voice commands, the user to a location within the given space having a greatest signal strength relative to the power-consuming electric device; and updating, within the AR wireless charging layout, an AR visual depicting the location of the power-consuming electric device as it relocates to the location having the greatest signal strength.

2. The method of claim 1, wherein the one or more signals further comprise electromagnetic field (EMF) Wi-Fi signals providing internet connectivity and EMF wireless charging signals providing wireless power transfer, and wherein the one or more wireless charger devices comprise radio frequency (RF) wireless chargers.

3. The method of claim 1, wherein the location of the power-consuming electric device is identified using indoor navigation techniques within the given space or is received from a global positioning system (GPS) receiver of the power-consuming electric device.

4. The method of claim 1, wherein identifying the respective signal strengths of the one or more wireless charger devices relative to the location of the power-consuming electric device comprises identifying respective locations of the one or more wireless charger devices within the given space based on the contextual information of their respective transmitted signals.

5. The method of claim 1, further comprising:
creating a virtual reality (VR) wireless charging layout of the given space based on the signal strength map.

6. A computer system, the computer system comprising:
one or more processors, one or more computer-readable memories, one or more computer readable storage medium, and program instructions stored on at least one of the one or more computer readable storage medium for execution by at least one of the one or more processors via at least one of the one or more memories, wherein the computer system is capable of performing a method comprising:
receiving one or more signals from one or more wireless charger devices within a given space, wherein the one or more signals comprise contextual information of the one or more wireless charger devices and their respectively transmitted signals;

identifying a location of a power-consuming electric device within the given space;

identifying, based on the contextual information, respective signal strengths of the one or more wireless charger devices relative to the location of the power-consuming electric device;

retrieving a floor plan of the given space;

creating a signal strength map of the identified respective signal strengths using the floor plan;

creating an augmented reality (AR) wireless charging layout of the given space based on the signal strength map and displaying the AR wireless charging layout to a user of the power-consuming electric device, wherein the AR wireless charging layout comprises AR visuals, overlaid on the retrieved floor plan, and wherein the AR visuals depict the identified location of the power-consuming electric device, the identified respective locations of the one or more wireless charger devices, and the identified respective signal strengths of the one or more wireless charger devices;

guiding, using text commands and voice commands, the user to a location within the given space having a greatest signal strength relative to the power-consuming electric device; and updating, within the AR wireless charging layout, an AR visual depicting the location of the power-consuming electric device as it relocates to the location having the greatest signal strength.

7. The computer system of claim 6, wherein the one or more signals further comprise electromagnetic field (EMF) Wi-Fi signals providing internet connectivity and EMF wireless charging signals providing wireless power transfer, and wherein the one or more wireless charger devices comprise radio frequency (RF) wireless chargers.

8. The computer system of claim 6, wherein the location of the power-consuming electric device is identified using indoor navigation techniques within the given space or is received from a global positioning system (GPS) receiver of the power-consuming electric device.

9. The computer system of claim 6, wherein identifying the respective signal strengths of the one or more wireless charger devices relative to the location of the power-consuming electric device comprises identifying respective locations of the one or more wireless charger devices within the given space based on the contextual information of their respective transmitted signals.

10. The computer system of claim 6, further comprising:
creating a virtual reality (VR) wireless charging layout of the given space based on the signal strength map.

11. A computer program product, the computer program product comprising:
one or more computer readable storage medium and program instructions stored on at least one of the one or more computer readable storage medium, the program instructions executable by a processor capable of performing a method, the method comprising:
receiving one or more signals from one or more wireless charger devices within a given space, wherein the one or more signals comprise contextual information of the one or more wireless charger devices and their respectively transmitted signals;

identifying a location of a power-consuming electric device within the given space;

identifying, based on the contextual information, respective signal strengths of the one or more wireless charger devices relative to the location of the power-consuming electric device;

retrieving a floor plan of the given space;

creating a signal strength map of the identified respective signal strengths using the floor plan;

creating an augmented reality (AR) wireless charging layout of the given space based on the signal strength map and displaying the AR wireless charging layout to a user of the power-consuming electric device, wherein the AR wireless charging layout comprises AR visuals, overlaid on the retrieved floor plan, and wherein the AR visuals depict the identified location of the power-consuming electric device, the identified respective locations of the one or more wireless charger devices, and the identified respective signal strengths of the one or more wireless charger devices;

guiding, using text commands and voice commands, the user to a location within the given space having a greatest signal strength relative to the power-consuming electric device; and updating, within the AR wireless charging layout, an AR visual depicting the location of the power-consuming electric device as it relocates to the location having the greatest signal strength.

12. The computer program product of claim 11, wherein the one or more signals further comprise electromagnetic field (EMF) Wi-Fi signals providing internet connectivity and EMF wireless charging signals providing wireless power transfer, and wherein the one or more wireless charger devices comprise radio frequency (RF) wireless chargers.

13. The computer program product of claim 11, wherein the location of the power-consuming electric device is identified using indoor navigation techniques within the given space or is received from a global positioning system (GPS) receiver of the power-consuming electric device.

14. The computer program product of claim 11 wherein identifying the respective signal strengths of the one or more wireless charger devices relative to the location of the power-consuming electric device comprises identifying respective locations of the one or more wireless charger devices within the given space based on the contextual information of their respective transmitted signals.

* * * * *